United States Patent Office 2,961,330
Patented Nov. 22, 1960

2,961,330
LINEAR POLYMERS

Lewis S. Meriwether, Norwalk, Conn., assignor to American Cyanamid Company, New York, N.Y., a corporation of Maine No Drawing. Filed Nov. 17, 1958, Ser. No. 774,152

18 Claims. (Cl. 106—285)

This invention relates to new synthetic materials, and more particularly, to new and useful linear polymers of monoalkyl-, —mono(dialkylamino)alkyl-, and monocycloalkyl-substituted acetylenes. The linear polymers of this invention may be represented by the following general formula:

I          $R-C \equiv C-(X)_n-Y$ wherein —X— represents at least one member of the class consisting of —CR'=CH— and —CH=CR"—, Y represents at least one member of the class consisting of —CH=CHR''' and —CR''''=CH$_2$, R, R', R", R''', and R'''' in each of the above formulas representing a member of the class consisting of the same alkyl, dialkylaminoalkyl, and cycloalkyl groups; and n represents a number having an average value ranging from 1–100. Furthermore, this invention also includes the use of these polymers as drying oils and additives to drying oils, for use as a base for paints, lacquers, etc.

Still more particularly the present invention is concerned with liquid, linear polymeric material represented by the general formula $$R-C \equiv C-(X)_n-Y$$

wherein

R represents a monovalent radical selected from the group consisting of alkyl, dialkylaminoalkyl and cycloalkyl radicals each having from 1 to 18 carbon atoms in each hydrocarbon grouping thereof;

X represents a divalent radical selected from the group represented by the general formulas —CR'=CH— and —CH=CR"— wherein R' and R" are each the same monovalent radical selected from the group defined above with respect to R, and each is the same radical from the said group as is the radical represented by R;

Y represents a monovalent radical selected from the group represented by the general formulas —CH=CHR''' and —CR''''=CH$_2$ wherein R''' and R'''' are each the same monovalent radical selected from the group defined above with respect to R, and each is the same radical from the said group as are the radicals represented by R, R' and R"; and n represents a number having an average value ranging from 1 to about 6, inclusive.

The scope of the invention also includes synthetic drying oil compositions consisting essentially of (1) the liquid, linear, polymeric material that has just been defined in the preceding sentence and (2) a metallic drier in an amount corresponding to from 0.005% to 2.0% by weight of the polymeric material of (1).

Illustrative examples of radicals represented by R, R', R", R''', and R'''' in the above formulas are methyl through octadecyl or higher, cyclopropyl through cycloheptyl, and dialkylaminoalkyl groups, wherein the alkyl components thereof are the same examples of alkyl radicals mentioned above with reference to R, R', etc. The invention is not intended to be restricted by way of the above illustrative groups.

One object of the present invention is to provide a new and useful class of linear polymers from relatively inexpensive raw materials. The linear polymers with which the invention is concerned can be isolated and used alone in various applications, or they can be employed in admixtures with each other in any proportions.

Another object of the invention is to provide new and useful synthetic drying oils from linear polymers of the kind embraced by Formula I. These new drying oils are useful components of paints, lacquers, and other compositions where natural drying oils normally are employed.

Still other objects of the invention will be apparent to those skilled in the art from the following more detailed description.

The above series of linear polymers is made by refluxing the basic monomer in a solvent such as benzene or cyclohexane while in the presence of a nickel-carbonyl-phosphine catalytic complex. Exceptions to this are methyl and ethyl acetylenes which because of their volatility should be reacted in an autoclave under superatmospheric pressure. By choosing a nickel-carbonyl-phosphine catalyst, for example one having the general formula $$Ni(CO)_n(PR_3)_{4-n}$$

where R is an alkyl, cycloalkyl, cyanoalkyl, phenyl, alkoxy, or aryloxy radical and n is 2 or 3, it is possible to obtain different proportions of the resulting products of polymerization. The investigation of certain of these catalysts per se is presented in more detail in Meriwether et al. copending application Ser. No. 774,150, filed concurrently herewith.

It was quite surprising and unexpected that linear polymers, e.g., trimers, tetramers, pentamers, hexamers, heptamers, etc., of the aforementioned mono-substituted acetylenes could be obtained by polymerization as described briefly above and more fully hereinafter, since prior investigators reported that unsubstituted acetylene and substituted acetylenes different from those employed in practicing the present invention yielded aromatic products [see Kleinschmidt, U.S. Patent No. 2,542,417; Rose and Stathem, J. Chem. Soc., 1950, pp. 69 and 70; and Reppe and Schweckendiek, Annalen, 560, 104 (1948)] when subjected to similar catalytic influences and reaction conditions. This is all the more surprising and in no way could have been predicted when it is considered that almost all disubstituted acetylenes do not react (polymerize) under the same catalytic and other reaction conditions used in polymerizing, to linear polymers, those mono-substituted acetylenes employed in practicing the present invention in the manner herein set forth.

It has been found that the polymerization of these substituted acetylenes covers a very broad field, quite contrary to the teachings of the prior art. Variation of the nickel-carbonyl-phosphine catalysts is not the only means by which the products can be controlled. For example, the ratio of dimer to trimer can be caused to vary according to the solvent used. By choosing a different starting acetylene, catalyst, solvent, proportions of ingredients, etc., a wide variety of dimers, trimers. tetramers, and polymers of higher average molecular weight can be obtained.

*Example 1*

A typical example of the production of the new linear polymers is the polymerization of heptyne-1 in cyclohexane, Ni(CO)$_2$($\theta_3$P)$_2$ being the catalyst. (By the symbol $\theta$ in the foregoing formula and other formulas hereinafter given is meant the phenyl radical or grouping.)

Heptyne-1 (0.25 mole) and Ni(CO)$_2$($\theta_3$P)$_2$ (0.001 mole) are refluxed in 125 ml. of benzene for five hours. The dark-brown solution is filtered, the solvent is removed, and the resulting oil is fractionated under vacuum. Five ml. of heptyne dimer, B.P. 55°–60° C./0.7 mm., $n_D^{25}$ 1.4661, and 14 ml. of heptyne trimer, B.P. 115°–120° C./0.1 mm., $n_D^{25}$ 1.4853 are obtained. The pot residue contains higher polymers. The structures of the linear dimers and trimers are determined from infrared and ultraviolet spectra and by conversion to the saturated compounds and comparison with authentic synthesized compounds.

The following example shows the linear polymerization of pentyne-1 using the catalyst having the formula $Ni(CO)_2[P(CH_2CH_2CN)_3]_2$, which catalyst is more fully described and is broadly and specifically claimed in my aforementioned copending application Serial No. 774,150.

Example 2

One hundred and two grams of pentyne and 3 g. of $Ni(CO)_2[P(CH_2CH_2CN)_3]_2$ are added to 500 cc. of acetonitrile and the solution is heated at reflux for six hours. The color of the solution turns dark brown. The product is insoluble in acetonitrile and separates out as the solution is cooled. Petroleum ether is added and the solution is extracted with 10% HCl to dissolve the nickel salts and to take up the acetonitrile. The petroleum ether layer is washed with water twice and dried overnight with $Na_2SO_2$. The petroleum ether is distilled off and the product is distilled under vacuum.

| Fraction | B.P. (°/mm.) | Wt., g. |
|---|---|---|
| 1 | 30-50/0.4 | 0.5 |
| 2 | 50-75/0.4 | 15 |
| 3 | 75-100/0.5 | 2.5 |
| 4 | 100-145/0.5 | 5.5 |
| 5 | polymeric residue | 60 |

Anal. Fract. 5: $(C_5H_8)_n$, M.W. 555.6, (cryoscopic benzene), $n=$about 8.

Theory: C, 88.24; H, 11.76. Found: C, 87.94; H, 11.70.

The infrared spectra of these fractions indicates the presence of the following structures: asymmetrically disubstituted acetylene, symmetrically and asymmetrically disubstituted ethylenes, and conjugated olefins. Mass spectrometric analyses indicate the following approximate percentages: Fraction 2, 85% trimer, 12% tetramer, 2% pentamer, 1% hexamer; Fraction 4, trace of trimer, 53% tetramer, 36% pentamer, 12% hexamer. Fraction 5 could not be analyzed because of low volatility.

The following example illustrates the polymerization of a cycloalkyl-substituted acetylene.

Example 3

5.3 grams of cyclohexylacetylene in 75 cc. benzene are slowly added to a refluxing solution of 0.5 g. of $Ni(CO)_2(\phi_3P)_2$ in 75 cc. benzene. The solution is refluxed for five hours. The color changes from yellow to dark cherry red. The solution is cooled, filtered, and the benzene is stripped off. The product, distilling at 200° C./0.01 mm., is a yellow viscous liquid; 1.5 g. (28% yield).

The following tables set forth more examples of polymerizations with their reaction conditions and products.

TABLE I
*Polymerization of acetylenes with $Ni(CO)_2(\phi_3P)_2$*

| Example No. | Acetylene | Conc. (m./l.) | Cat. Conc. (m./l.) | Solvent | Time (hrs.) | Temp. (°C.) | Linear Products | Yield (percent) |
|---|---|---|---|---|---|---|---|---|
| 4 | $(C_2H_5)_2N-CH_2-C\equiv CH$ | 1.00 | 0.014 | Benzene | 2 | 80 | Dimer / Trimer | 7.5 / 5.8 |
| 5 | $C_6H_{11}-C\equiv CH$ | 1.37 | 0.0043 | Acetonitrile | 4 | 80 | Dimer / Trimer | 26 / 18 |
| 6 | $C_4H_9C\equiv CH$ | 2.0 | 0.0062 | 80% n-hexane, 20% benzene | 8 | 71 | Trimer / Dimer / Tetramer | 57 / 5.9 / 0.2 |
| 7 | $C_5H_{11}-C\equiv CH$ | 2.0 | 0.0080 | Benzene | 5 | 83 | Trimer / Dimer | 48 / 15 |
| 8 | $C_5H_{11}-C\equiv CH$ | 1.85 | 0.0058 | Cyclohexane | 4 | 84 | Trimer / Dimer / Tetramer | 33 / 6.7 / 0.3 |
| 9 | $C_6H_{11}-C\equiv CH$ | 0.309 | 0.0052 | Benzene | 4 | 80 | Linear polymers 20 as indicated from UV and IR data, probably dimer and trimer. | |

TABLE II
*Products of the acetylene polymerizations*

| Example No. | Linear Product | Description | B.P. (°C.), mm. | Wt. (g.) | $n_D^{25}$ | Elementary Analysis | M.W. |
|---|---|---|---|---|---|---|---|
| 4 | Dimer / Trimer | Yellow liquid / do | 108-111/0.1 / 162-163/0.1 | 0.9 / 0.7 | 1.4780 / 1.4962 | | 222 (MS) / 333 (MS) |
| 5 | Dimer / Trimer | Pale yellow liquid / Yellow liquid | 74-82/0.5 / 135-141/0.5 | 6.16 / 4.25 | 1.4625 / 1.4905 | | 192 (MS) / 288 (MS) |
| 6 | Dimer / Trimer / Tetramer | Colorless liquid / Pale yellow liquid / Present in trimer | 50-60/0.1 / 80-90/0.1 / 80-90/0.1 | 1.2 / 1.6 / Trace | 1.4650 / 1.4893 | | 164 (MS) / 246 (MS) / 328 (MS) |
| 7 | Dimer / Trimer | Pale yellow liquid / Yellow liquid | 55-60/0.8 / 115/0.1 | 3.6 / 11.6 | 1.4661 / 1.4847 | Calc. C 87.42, H 12.58 / Fd. C 87.20, H 12.62 | 192 (MS) / 288 (MS) / 189 (CB) |
| 8 | Dimer / Trimer / Tetramer | Colorless liquid / Yellow liquid / Present in trimer | 80/0.5 / 145/0.5 / 145/0.5 | 1.6 / 8.0 / Trace | 1.4596 / 1.4858 | Calc. C 87.42, H 12.58 / Fd. C 87.49, H 12.62 | 288 (MS) / 287.3 (CB) / 384 (MS) |
| 9 | Linear polymers as indicated from UV and IR data, probably dimer and trimer. | Yellow liquid | about 200/0.5 | 1.0 | | | |

(MS)=Mass. Spec.
(CB)=Cryoscopic benzene.

The acetylene polymers embraced by Formula I normally consist of mixtures of isomers which are not readily separable. The lower members of the group, the trimers, can exist in four possible structural isomers:

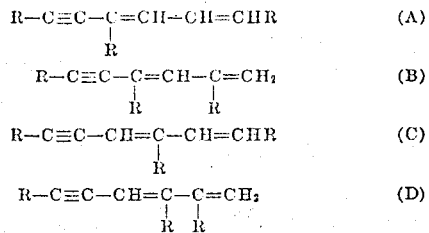

The presence of both types of Y groupings, —CH=CHR (structures A and C) and —CR=CH$_2$ (structures B and D), was ascertained from the infrared spectrum in which the former grouping is identified by a band in the 960–980 cm.$^{-1}$ region and the latter grouping by a band in the 890–900 cm.$^{-1}$ region. Two methods were used to demonstrate the presence of both types of —X— groupings, —CR=CH— (structures A and B) and

(structures C and D). The trimers of pentyne-1 and heptyne-1 were studied. The trimer mixture was partially ozonized or oxidized with chromic acid, cleaving the two double bonds but leaving the triple bond intact. The two different fragments which would result from the two —X— groupings, R—C=C—CO—R (from A and B) and R—C=C—CO$_2$H (from C and D), were both obtained. The trimer mixture was also totally hydrogenated to the saturated hydrocarbons. The presence of all three possible isomers:

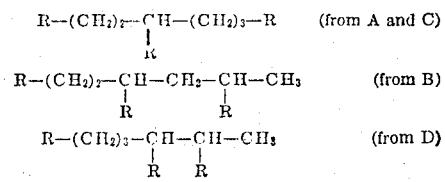

in the hydrogenated product was shown by comparison with the known synthesized compounds using gas chromatography. Only traces of the last hydrocarbon were found, presumably for steric reasons.

Although no structural studies have been done on the tetramers or higher polymers, their infrared spectra indicate the presence of both types of Y groupings and they are assumed to have both types of —X— groupings distributed randomly along the polymer chain.

These linear acetylene polymers are distinguished by having infrared absorption in the following regions: about 2200–2250 cm.$^{-1}$, about 1600–1625 cm.$^{-1}$, and about 890–980 cm.$^{-1}$, and strong absorption in the ultraviolet region between 225 and 400 m$\mu$ with absorptivities between 20 and 100.

The above examples are not presented with the intention of limiting the scope of the invention, but are only presented to illustrate certain preferred embodiments which are intended to aid in a better understanding of the invention.

The linear polymers of this invention contain a triple-bond in one of their terminal groups, as evidenced by their infrared and Raman spectra. Contrary to what might be expected this triple bond is always found to be free from combination with any components of the reaction medium.

Further study has been made with catalysts represented by the general formula Ni(CO)$_2$(R$_3$P)$_2$ on dialkyl and dicycloalkyl acetylenes, but in each and every case, using the conditions employed in practicing the present invention, only starting material is found at the end of the run. In the above formula R has the same meaning as given above with reference to Formula II.

Not only have the linear products synthesized by the herein disclosed invention been found useful as drying oils, but their very nature suggests them to be useful as ultraviolet light absorbers, as antiozonants, and as intermediates for making polyalcohols, polyepoxides, epoxy resins, etc. Moreover, merely by total hydrogenation, they become saturated aliphatic or alicyclic compounds; or by partial hydrogenation one can obtain products having both unsaturated and saturated bonds between adjacent carbon atoms and which have intermediate properties.

Typical of these linear polymers is the polymer of pentyne-1, (C$_3$H$_7$—C≡CH)$_n$, where $n$ has an average value of 8. This polymer is shown to have drying characteristics as shown by the following example.

*Example 10*

The polymer of C$_3$H$_7$—C≡CH which has been prepared by the method set forth in Example 2 is tested for its drying characteristics as follows: A film of about 1.5 mils wet is cast from a 60% polymer solution made up from 3 g. of polymer (C$_3$H$_7$—C≡CH)$_n$ in toluene containing two drops (0.07 ml.) of a conventional drying catalyst, more particularly 6% cobalt naphthenate in mineral spirits. Seventeen hours later, the film is no longer wet; after twenty hours it is tack-free and after three-and-one-half days the surface is hard. These properties show the utility of linear polymers of this invention in varnishes, enamels, and core binders.

These polymers open up an entirely new class of compounds which can be used as drying oils and as additives to oils for increasing their drying qualities. Merely by incorporating a conventional drying catalyst these polymers manifest a tack-free film in less than a day.

An example of a particular composition which may be used as a drying oil is a mixture of the polymers of pentyne-1, which is described in detail in Example 2 and the use of which is described in Example 10. However, the scope of this invention is intended to cover the use of all the other polymers embraced by Formula I in place of the specific linear polymer employed in said example, more particularly polymers such as were produced as described in Examples 1–9.

Various drying catalysts which may be employed with the polymers are calcium, lead and cobalt naphthenate and calcium, lead, cobalt and iron octalate. However, none of these drying catalysts have any particular advantage over any other catalysts and, therefore, these drying catalysts are presented with the intention of illustrating and aiding in the use of the invention and not with the intention of limiting the use of the hereinbefore described polymers with the above recited drying catalysts. These drying catalysts were usually added in amounts ranging from .01 to .50%; by weight of the polymer. However, when baking is employed, quantities of catalysts as low as .005% by weight of the polymer may be used, while for wrinkle finishes it is sometimes necessary to use as much as 2%. The weight of the catalyst used is based solely on the metal content of the catalyst.

The following two examples show the trimer being used as an intermediate in the preparation of saturated or partially saturated aliphatic compounds through hydrogenation.

*Example 11*

Pentyne trimer (1.5 ml.) in 100 ml. of absolute ethanol is hydrogenated in a Parr apparatus under 40 lbs. pressure of H$_2$ for 12 hours using 0.1 g. of PtO$_2$ as catalyst. The solution is filtered and the alcohol is removed. The resulting colorless liquid ($n_D^{28}$ 1.4461) is shown, using gas chromatography, to be a mixture of 6-propyldodecane, 4-methyl, 6-propylundecane and 4-methyl 5-propylundecane by comparison with the known compounds.

*Example 12*

Pentyne trimer (0.4 g.) in 50 ml. of absolute ethanol is hydrogenated at atmospheric pressure using 0.1 g. of Lindlar's catalyst [Pd on $CaCO_3$, deactivated with $Pb(OAc)_2$] for three hours. One equivalent of $H_2$ is taken up. The solution is filtered and the alcohol is removed. The resulting liquid is found to be a mixture of 6-propyl-4,6,8-dodecatriene and 2,3- and 2,4-dipropyl-1,3,5-nonatriene.

Examples 11 and 12 clearly indicate that many new aliphatic and alicyclic compounds may be prepared by using these polymerized acetylenes as intermediate compounds.

I claim:

1. Liquid, linear polymeric material represented by the general formula $$R-C{\equiv}C-(X)_n-Y$$

wherein

R represents a monovalent radical selected from the group consisting of alkyl, dialkylaminoalkyl and cycloalkyl radicals each having from 1 to 18 carbon atoms in each hydrocarbon grouping thereof;

X represents a divalent radical selected from the group represented by the general formulas $$-CR'{=}CH-\text{ and }-CH{=}CR''-$$

wherein R' and R'' are each the same monovalent radical selected from the group defined above with respect to R, and each is the same radical from the said group as is the radical represented by R;

Y represents a monovalent radical selected from the group represented by the general formulas $$-CH{=}CHR'''\text{ and }-CR''''{=}CH_2$$

wherein R''' and R'''' are each the same monovalent radical selected from the group defined above with respect to R, and each is the same radical from the said group as are the radicals represented by R, R' and R''; and n represents a number having an average value ranging from 1 to about 6, inclusive.

2. Liquid, linear polymeric material as in claim 1 wherein n in the general formula represents 1.

3. Liquid, linear polymeric material as in claim 1 wherein n in the general formula represents 2.

4. Liquid, linear polymeric material as in claim 1 wherein n in the general formula represents 3.

5. Liquid, linear polymeric material as in claim 1 wherein R, R', R'', R''' and R'''' in the formulas appearing in said claim each represents a $C_5H_{11}-$ radical.

6. Liquid, linear polymeric material as in claim 5 wherein n in the general formula represents 1.

7. Liquid, linear polymeric material as in claim 5 wherein n in the general formula represents 2.

8. Liquid, linear polymeric material as in claim 1 wherein R, R', R'', R''' and R'''' in the formulas appearing in said claim each represent a $C_3H_7-$ radical.

9. Liquid, linear polymeric material as in claim 8 wherein n in the general formula represents 1.

10. Liquid, linear polymeric material as in claim 8 wherein n in the general formula represents 2.

11. Liquid, linear polymeric material as in claim 1 wherein R, R', R'', R''' and R'''' in the formulas appearing in said claim each represent a $(C_2H_5)_2NCH_2-$ radical.

12. Liquid, linear polymeric material as in claim 11 wherein n in the general formula represents 1.

13. A synthetic drying-oil composition consisting essentially of (1) the liquid, linear, polymeric material defined in claim 1 and (2) a metallic drier in an amount corresponding to from 0.005% to 2.0% by weight of the polymeric material of (1).

14. A synthetic drying-oil composition as in claim 13 wherein the metallic drier constitutes from 0.01% to 0.5% by weight of the polymeric material of (1).

15. A synthetic drying-oil composition consisting essentially of (1) the liquid, linear, polymeric material defined in claim 5 and (2) a metallic drier in an amount corresponding to from 0.005% to 2.0% by weight of the polymeric material of (1).

16. A synthetic drying-oil composition as in claim 15 wherein the metallic drier is cobalt naphthenate.

17. A synthetic drying-oil composition consisting essentially of (1) the liquid, linear, polymeric material defined in claim 8 and (2) a metallic drier in an amount corresponding to from 0.005% to 2.0% by weight of the polymeric material of (1).

18. A synthetic drying-oil composition as in claim 17 wherein the metallic drier is cobalt naphthenate.

References Cited in the file of this patent

UNITED STATES PATENTS

| | | |
|---|---|---|
| 1,812,544 | Collins | June 30, 1931 |
| 1,828,560 | Liefde | Oct. 20, 1931 |
| 2,743,264 | Buselli et al. | Apr. 24, 1950 |
| 2,708,639 | Miller | May 17, 1955 |
| 2,829,065 | Gleason | Apr. 1, 1958 |

FOREIGN PATENTS

| | | |
|---|---|---|
| 530,753 | Italy | July 15, 1955 |

UNITED STATES PATENT OFFICE
CERTIFICATION OF CORRECTION

Patent No. 2,961,330                          November 22, 1960

Lewis S. Meriwether

It is hereby certified that error appears in the above numbered patent requiring correction and that the said Letters Patent should read as corrected below.

Column 1, line 11, for "—mono" read -- -mono --; lines 56 and 57, for "drying oil" read -- drying-oil --; column 2, line 21, to the left of the formula insert the Roman numeral -- II --; lines 64 and 67, for "$Ni(CO)_2(\Theta_3P)_2$", each occurrence, read -- $Ni(CO)_2(\emptyset_3P)_2$ --; line 65, for "O" read -- $\emptyset$ --; column 3, line 21, for "$Na_2SO_2$" read -- $Na_2SO_4$ --; columns 3 and 4, Table I, eighth column thereof, under the heading "Linear Products", line 14, strike out "20" and insert the same in the ninth column, under the heading "Yield (percent), as the entry for Example 9; column 7, line 49, for "represents" read -- represent --.

Signed and sealed this 2nd day of May 1961.

(SEAL)
Attest:

ERNEST W. SWIDER                                DAVID L. LADD
Attesting Officer                                Commissioner of Patents